G. N. GENTNER.
LOG HAUL.
APPLICATION FILED NOV. 14, 1908.
932,776.
Patented Aug. 31, 1909.
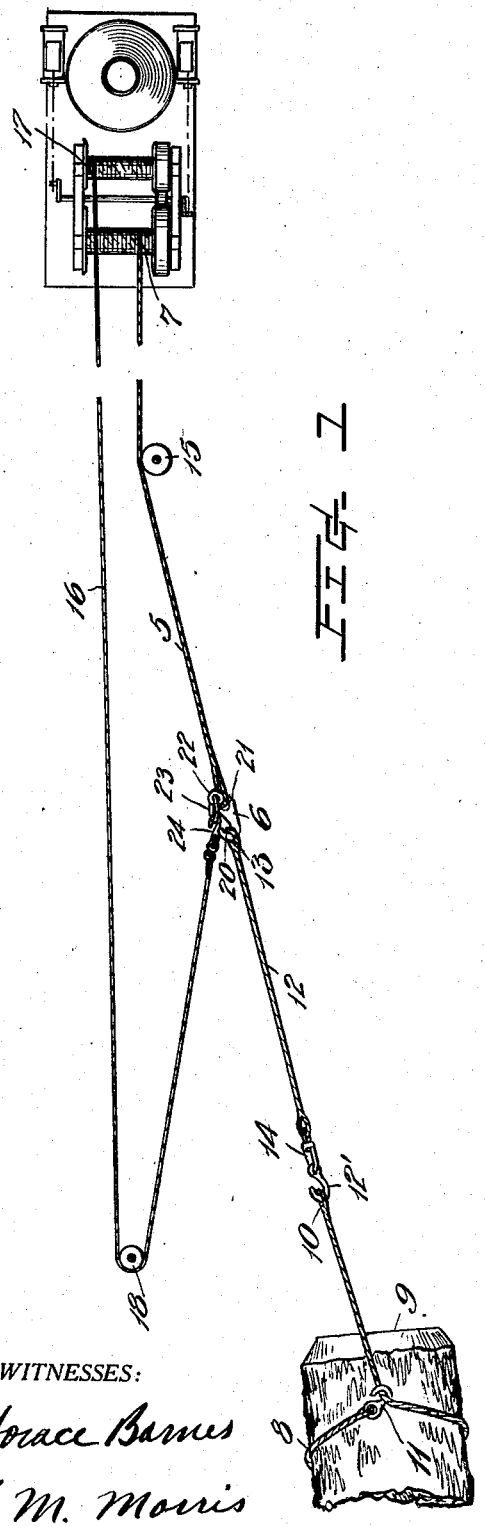
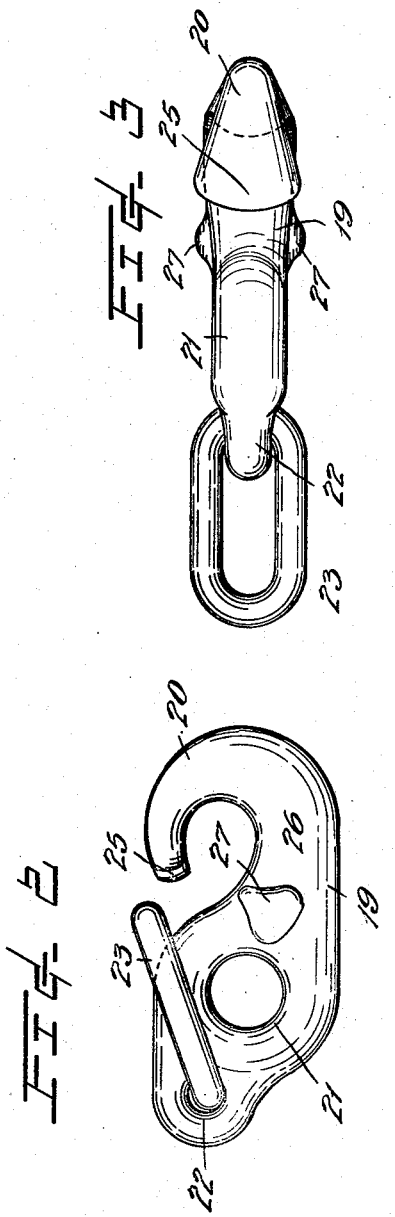
WITNESSES:
Horace Barnes
L. M. Morris
INVENTOR:
Georg N. Gentner
BY
Pierre Barnes
ATTORNEY.

UNITED STATES PATENT OFFICE.

GEORG N. GENTNER, OF McMURRAY, WASHINGTON.

LOG-HAUL.

932,776.

Specification of Letters Patent.  Patented Aug. 31, 1909.

Application filed November 14, 1908. Serial No. 462,685.

*To all whom it may concern:*

Be it known that I, GEORG N. GENTNER, a citizen of the United States, residing at McMurray, in the county of Skagit and State of Washington, have invented certain new and useful Improvements in Log-Hauls, of which the following is a specification.

This invention relates to log-hauling appliances; and its object is the provision of means whereby the load is reliably held to the hauling line and in such a manner that the operations of attaching or disconnecting the hauling line is facilitated.

With these ends in view the invention consists in the novel construction and adaptation of devices as will be hereinafter described with reference to the accompanying drawings, wherein—

Figure 1 is a plan view of apparatus such as employed in the hauling of large logs from the woods and the application of my invention. Fig. 2 is a side elevation of the main hook, drawn to an enlarged scale. Fig. 3 is a plan view of Fig. 2 with the link thereof thrown back.

As shown in Fig. 1, a main hauling line 5 is provided at one end with a hook 6 while its other end is wound about the main drum 7 of a logging engine. 8 is a line known as a "choker" and is usually formed with an eye 10 at one end, with a hook 11 at the other to afford means of securement to a log 9 as by being hooked upon the line after the same has been passed about the log, as clearly represented in the view. This line may be connected directly with said main line, but desirably connection is had between the main line and the choker line by an interposed line 12, commonly known as the "bull-hook line," having a hook 12' upon one end to engage the choker eye 10 and an eye 13 at the other end to receive the hook 6 of the main line and it is also desirably provided with a swivel connection 14 intermediate the hook and the adjacent part of this line. One or more fair-leader pulleys, such as 15, are utilized to properly guide the direction of the main line. When the log has been drawn sufficiently far by such devices, the choker is disconnected from the log and this line together with the bull-hook line is drawn back with the paying out of the main line from the drum to be reëmployed in pulling out another log. This reverse action is accomplished by a haul-back line 16 which is wound about an ancillary drum 17 of said engine and is connected with the main-line hook 6 after passing about one or more guide pulleys, such as 18. The hook 6, which is best shown in Figs. 2 and 3, is comprised of a shank 19 connecting the hook-bill 20 with the hook-eye 21 and beyond this eye is another eye 22 to accommodate a link 23 which, in effect, is a part of the aforesaid haul-back line with which it is connected by a hook 24 permanently secured to this line. The hook 6 is also characterized by having its bill-point 25 made wider than the neck 26 and also by having laterally projecting cheeks 27 upon the opposite sides of the shank and in proximity of the hook-eye 21 into which, as shown in Fig. 1, the main line is secured. The purpose of having a broadened bill-point is to afford a saddle-like seat for the eye of the line in which the hook is engaged, while the protruding cheeks 26 are intended to prevent obstacles in the line of travel from encountering such line, as much as may be.

In operation, the choker line 8 being connected with the log and also with the bull-hook line 12 and the latter being connected as before explained to the main line 5, then by actuating the winding drum 7 the log is drawn toward the hauling engine. Meanwhile the haul-back line 16 having its remote end carried by the hook 6 is drawn in the direction of the latter while being paid out or unwound from the ancillary drum 17. In thus being drawn with the main line the resistant weight of the haul-back line effects the holding of the link 23 rearwardly to cover the opening 28 of the hook to prevent, in the travel of the hook, brush or the like being caught therein and likewise preventing the bull-hook line from becoming disconnected as might occur where the speed of the log is temporarily greater than that of the main line, for example, on a down hill pull. The log being drawn to the extent of its travel is then disconnected from the lines and, by actuating the ancillary drum and letting the other drum rotate freely, the haul-back line redraws the main and choker lines back for the tender to apply to another log, and so on.

It will be apparent that the arrangement of certain parts of the hauling appliances may be varied to meet special conditions or selection of the operator; for example, the hook 6 can be made to form a part of the intermediate, or bull-hook connection instead of the main line and also that such bull-hook line may be eliminated and connection had directly between the choker line and the main line through the instrumentality of the hook 6. However, the bull-hook line is most advantageously employed as the lines most frequently break near the log and duplicate bull-hook and choker lines may readily be kept for replacing either of these lines when broken and with little loss of time. Heretofore hook connections have been made between the two last named lines but as far as I am aware no separable means such as a hook connection has been utilized between the bull-hook line and the main line, recourse being had to splicing with a consequent cessation of profitable work in the camp. I not only furnish means to overcome this disadvantageous manner of operation but also afford means to protect the eyes of both the bull-hook and main lines and that, too, by a hook which is guarded from picking up trash.

Having described my invention, what I claim, is—

1. In apparatus of the class described, a hook having two eyes connected by a shank with the hook-bill, said shank being provided upon its opposite sides with laterally protruding cheeks.

2. In apparatus of the class described, a hook having two eyes connected by a shank with a bill of increasing width from its neck to the bill point.

3. In apparatus of the class described, a hook having two eyes connected by a shank with a bill of increasing width from its neck to the bill-point, said shank being also provided with laterally projecting cheeks upon the opposite sides of the shank and intermediate of its length.

4. In apparatus of the class described, a hook having two eyes connected by a shank with a bill of increasing width from its neck to the bill-point, said shank being also provided with laterally projecting cheeks upon the opposite sides of the shank and intermediate of its length, and a link engaged in one of said eyes.

GEORG N. GENTNER.

Witnesses:
PIERRE BARNES,
HORACE BARNES.